United States Patent [19]

Sweeny et al.

[11] Patent Number: 5,584,513
[45] Date of Patent: Dec. 17, 1996

[54] PUSH IN PLASTIC TUBE FITTING

[75] Inventors: Michael A. Sweeny, Kent; John R. Greco, Ravenna; Donald E. Washkewicz, Solon, all of Ohio

[73] Assignee: Parker-Hannifin Corporation, Cleveland, Ohio

[21] Appl. No.: 337,651

[22] Filed: Nov. 10, 1994

Related U.S. Application Data

[63] Continuation of Ser. No. 847,383, Mar. 6, 1992, abandoned.

[51] Int. Cl.⁶ .................................................. F16L 17/00
[52] U.S. Cl. ......................... 285/323; 285/243; 285/328; 285/423
[58] Field of Search ........................ 285/322, 323, 285/307, 308, 310, 328, 319, 243; 281/423

[56] References Cited

U.S. PATENT DOCUMENTS

| | | | |
|---|---|---|---|
| 3,214,200 | 10/1965 | Carlson et al. | 285/323 |
| 3,653,689 | 4/1972 | Sapy et al. | 285/308 |
| 3,743,326 | 7/1973 | Courtot et al. | 285/323 |
| 3,884,513 | 5/1975 | Gassert | 285/322 |
| 4,178,023 | 12/1979 | Guest | 285/323 |
| 4,508,369 | 4/1985 | Mode | 285/323 |
| 4,621,842 | 11/1986 | Kowal et al. | 285/372 |
| 4,722,560 | 2/1988 | Guest | 285/323 |
| 5,064,223 | 11/1991 | Gross | 285/238 |
| 5,171,045 | 12/1992 | Pasbrig | 285/308 |

FOREIGN PATENT DOCUMENTS

| | | | |
|---|---|---|---|
| 287791 | 10/1988 | European Pat. Off. | 285/322 |
| 349344 | 1/1990 | European Pat. Off. | 285/322 |
| 364917 | 4/1990 | European Pat. Off. | 285/322 |
| 7705253 | 11/1977 | Netherlands | 285/323 |
| 1602077 | 11/1981 | United Kingdom | 285/322 |
| 8705087 | 8/1987 | WIPO | 285/308 |

Primary Examiner—Eric K. Nicholson
Attorney, Agent, or Firm—Christopher H. Morgan

[57] ABSTRACT

An improved plastic push in tube fitting includes a plastic body, an elastomer o-ring for sealing, and a plastic collet. The collet and o-ring are disposed in the body such that a tube can be pushed into the body through the collet and o-ring and held against withdrawal from the body by the collet. The collet is formed entirely of plastic and has a plurality of circumferential sections for encircling a tube pushed into the body. Each of the circumferential sections has a radially inwardly facing circumferential tube gripper. The tube gripper is formed by a ramp which faces a tube being pushed into the body so that the collet will encounter the ramp and move the circumferential sections radially apart. The gripper also includes a circumferential surface which faces away from a tube being pushed into the body. The circumferential ramp and the circumferential surface form a gripper edge at their junction and this edge engages and holds a tube pushed into the body through the collet. Preferably the ramp has an angle with respect to a tube pushed into the collet of between 15 and 40 degrees. Also preferably the internal angle between the circumferential ramp and the circumferential surface is between 75 and 120 degrees. The arcuate shape of the gripper edge is the same as the arcuate shape of the exterior of a tube pushed through the collet. The collet preferably is formed of hard plastics, such as poly (ether ether ketone), polyetherimide, polybutylene terephthalate, polyphthalamide and polymers of acetal homopolymer.

19 Claims, 3 Drawing Sheets

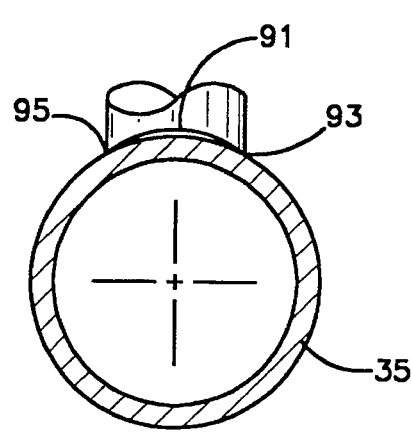
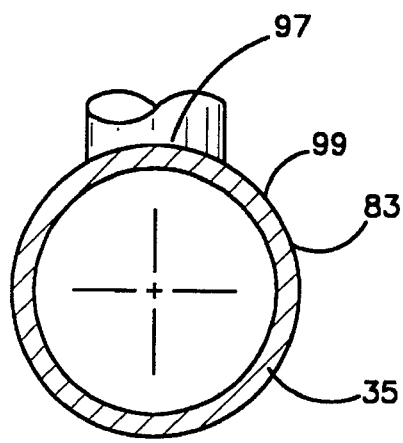
Fig.6 (PRIOR ART)　　　Fig.7
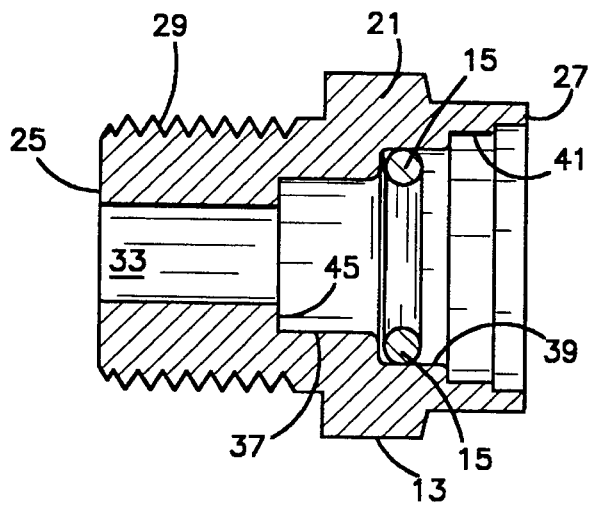
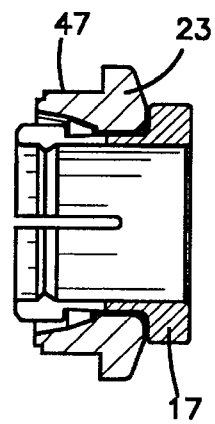
Fig.8　　　Fig.9
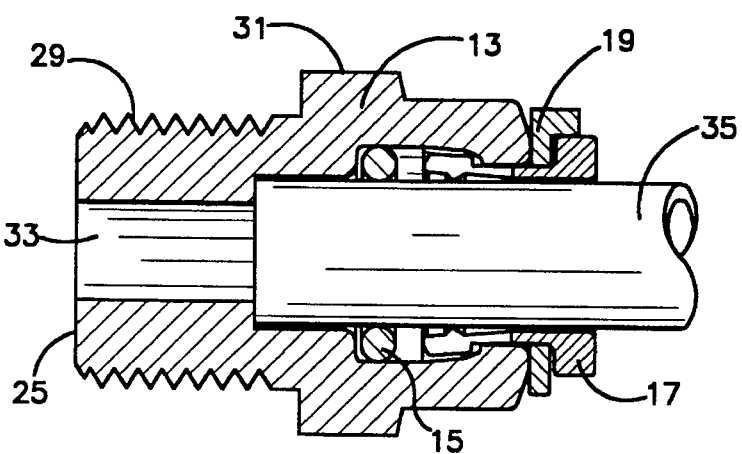
Fig.10

PUSH IN PLASTIC TUBE FITTING

This is a continuation of application Ser. No. 07/847,383 filed on Mar. 6, 1992 now abandoned.

BACKGROUND OF THE INVENTION

1. Field of the Invention

The present invention relates to tube fittings and more particularly tube fittings for use with plastic tube which can be sealingly connected to the tube by pushing the tube into the tube fitting.

2. Description of the Prior Art

Push in plastic tube fittings which allow a tube to be sealingly connected to the fitting by pushing the tube into the fitting generally include a body, a gripper and an o-ring for sealing. The o-ring and the gripper are disposed in the body such that a tube can be pushed into the body through the gripper and then the o-ring. The o-ring is compressed between the exterior of the tube and the body to seal the connection therebetween. The gripper captures the tube and prevents its withdrawal from the body.

Push in plastic tube fittings for use with plastic tubing have generally included a gripper formed on the interior of a cylindrical collet with extends from the exterior of the body to a camming surface on the interior of the body. The interior of the collet has an enlarged cam section which bears against the camming surface of the body such that as the collet moves axially outwardly the gripper on the interior of the collet is moved radially inwardly by the camming action of the cam section on the camming surface. This radially inward movement of the gripper bears against a tube which is disposed in the collet. This prevents the tube from being withdrawn from the fitting since the withdrawal movement of the tube carries the collet and tightens the gripper on the tube by the cam action of the collet cam sections. Examples of push in tube fittings of the type described are shown in U.S. Pat. Nos. 4,005,883 to Guest; 4,606,783 to Guest; 4,650,529 to Guest; 4,722,560 to Guest; and 3,653,689 to Legris.

A problem with push in plastic tube fittings has been that the plastic tubes are scratched by the gripper mechanism as they are pushed into the fitting. The scratches on the tube cause leak paths which are poorly sealed by the o-ring which extends about the exterior of the tube over the scratches. These scratches are caused by the sharp edges of the gripper. Moreover, most grippers are formed of metal and the metal tends to have both sharp edges and imperfections which can cause scratches.

Another problem with push in plastic tube fittings has been that the metal elements of the gripper serve as a source of contamination to fluids in the tube. Some fluids which are conveyed in the tube and tube fittings are easily contaminated by metals and, therefore, it is desirable not to have any metal components in the fluid path or the fitting. However, the stresses placed on fittings, especially the gripper portion of the fittings are sufficiently severe that prior art fittings have generally included metals as the only solution for this demanding application.

Another problem with tube fittings of the prior art which have metal grippers and nonmetal collets is that it is difficult to form the collet of plastic with metal grippers therein. First, the metal portions of the gripper are small pieces and difficult to locate. Secondly, it is difficult to accurately orient the metal portions in the plastic collet. Still further, the shapes and orientation of the various pieces of the fitting have been difficult to manufacture and assemble.

SUMMARY OF THE INVENTION

It is accordingly an object of the present invention to provide an improved push in plastic tube fitting. Particularly, it is an object to provide such a fitting which has an improved collet and gripper which are less likely to scratch a tube pushed therethrough while providing a secure tube grip to prevent removal of the tube from the fitting.

Another object of the present invention is to provide a fitting which has no metal parts therein and which provides a plastic gripper which provides a rugged and reliable tube grip. Still further, it is an object to provide such a fitting which easily manufactured and assembled.

In accordance with these objects the present invention provides an improved plastic push in tube fitting of the type having a plastic body, a seal for sealing between the body and a tube, and a plastic collet. The collet and seal are disposed in the body such that a tube can be pushed into the body through the collet and seal and then held against withdrawal from the body by the collet. The improvement includes the collet being formed entirely of plastic and having a plurality of circumferential sections for encircling a tube pushed into the body with each of the sections having a radially inwardly facing circumferential tube gripper formed of a circumferential ramp, a circumferential surface, and a gripper edge formed at the junction of these two. The circumferential ramp faces a tube being pushed into the body such that a tube being pushed into the body through the collet will encounter the ramp of each of the circumferential sections and move the circumferential sections radially apart. The circumferential surface faces away from the tube being pushed into the body. The gripper edge formed at the junction of the circumferential ramp and circumferential surface engages and holds a tube pushed into the body through the collet.

The circumferential ramp and the circumferential surface have a configuration such that, at the gripper edge, the ramp extends radially away from a tube inserted through the collet at an angle between 15 and 40 degrees. Also at the gripper edge the internal angle between the circumferential ramp and the circumferential surface is between 75 and 120 degrees. The configuration thus produced provides a gripper and gripper edge which are less likely to scratch a tube pushed through the collet while the ability of the gripper edge to hold a tube against withdrawal from the body is improved.

The gripper edge of the circumferential sections of the collet preferably extend in a circumferential arc approximately equal to the circumferential arc of the exterior of a tube which extends through the collet to spread the circumferential sections thereof and be held by the gripper edge. Importantly, this arc is not the same as the arc which would extend in a circle at the gripper edge with the collet in a relaxed condition. Such a circular arc based on the location of the gripper edge with the collet in a relaxed condition produces sharp edges with the collet in an expanded condition when a tube is pushed through the collet. It also reduces contact between the tube and gripper while the gripper arc of the present invention maximizes this contact for an improved grip.

Also preferably the collet of the present invention comprises a single molded piece with at least four arms having ends of which form circumferential sections. The arms urge the circumferential sections radially inwardly when a tube moves the sections radially outwardly. The body has a ramp opening in which the circumferential sections reside which ramp opening bears against and urges the circumferential sections radially inwardly as a tube held within the sections is moved toward withdrawal from the body. A plastic suitable for forming the collet must be harder than the tubes used in the fitting. Preferable collet materials include plastics selected from the group consisting of poly (ether ether ketone), poly ether ketones, fluoropolymers, polysulfones, polyesters, rigid nylon, polyetherimides, polybutylene terephthalates, polyphthalamides, and polymers of acetal homopolymer. Most preferably the collet is formed of a polyetherimide. Thus, an all plastic push in fitting which grips as well or better than fittings with metal grippers is achieved. This fitting is relatively easy to manufacture.

For a further understanding of the invention and further objects, features and advantages thereof, reference may now be had to the following description taken in conjunction with the accompanying drawings.

DESCRIPTION OF THE DRAWINGS

FIG. 6 is a schematic view of a radial cross-section of a tube with a prior art gripper section contacting the tube.

FIG. 7 is a schematic view of a radial cross-section of a tube with a section of a gripper according to the present invention contacting the tube.

FIG. 8 is an axial cross-sectional view of a portion of the device shown in FIG. 1 taken along the lines shown in FIG. 1 and partially assembled.

FIG. 9 is an axial cross-sectional view of another portion of the device shown in FIG. 1 taken along the lines shown in FIG. 1 and partially assembled.

FIG. 10 is an axial cross-sectional view of the device shown in FIG. 1 taken along the lines shown in FIG. 1 and assembled together with a clip.

DESCRIPTION OF PREFERRED EMBODIMENTS

Figure 1:
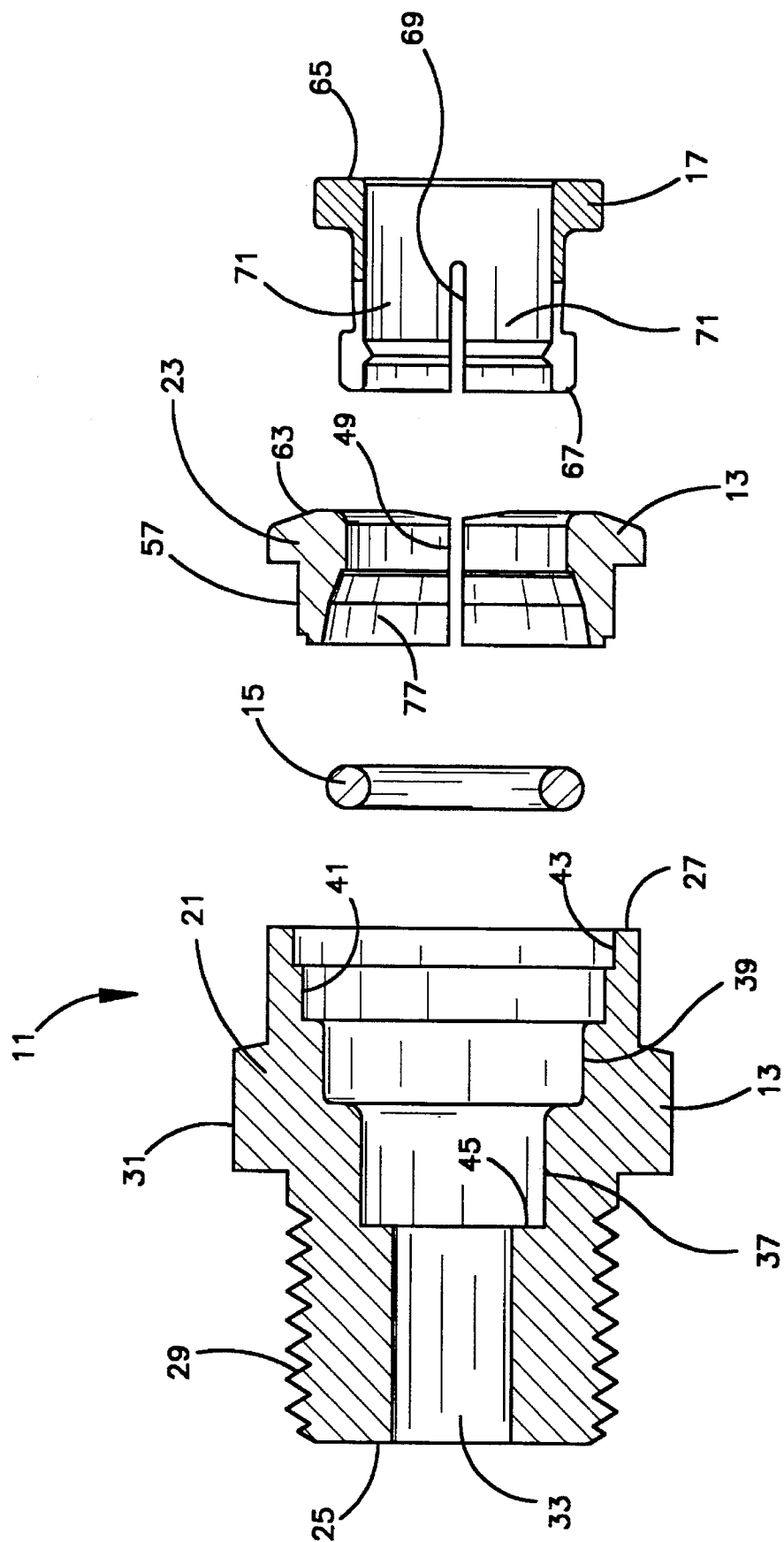
FIG. 1 illustrates a push in tube fitting constructed in accordance with the concepts of the present invention shown in an exploded, axial cross-sectional view.
Figure 2:
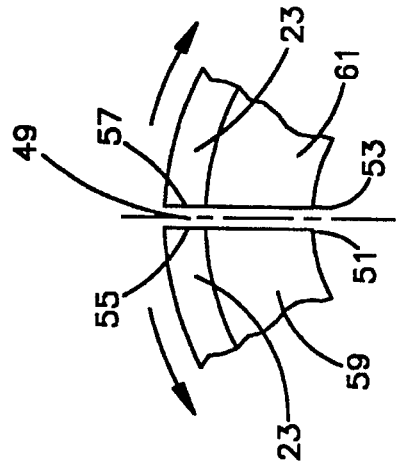
FIG. 2 is a top view of a portion of the device shown in FIG. 1.
Figure 3:
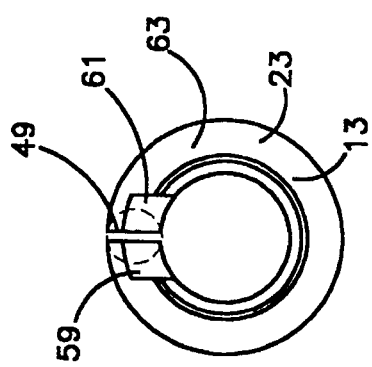
FIG. 3 is an enlarged top view of a portion of the device shown in FIG. 2.

Referring now to FIGS. 1–5 and 8–10 a push in tube fitting constructed according to the present invention is shown at 11. The tube fitting 11 is shown in an unassembled and exploded view in FIG. 1 and an assembled view in FIG. 10. The tube fitting 11 includes a body 13, an o-ring 15, a collet 17 and a clip 19. In the unassembled form shown in FIG. 1, the body 13 has a main body piece 21 and a retainer 23. When assembled the main body piece 21 and the retainer 23 form a single body 13.

The main body piece 21 is generally cylindrical in shape. It has a distal end 25 and a proximate end 27. The exterior of the body piece near the distal end 27 has exterior threads 29 to allow the fitting 11 to be attached to a fluid conducting component with a mating female thread (not shown) in a fluid tight connection. A hexagonal nut 31 is provided on an exterior midportion of the main body piece 21 to provide a means to tighten or loosen the threaded connection of the fitting 11 to a fluid conducting component.

The main body piece 21 has a cylindrical fluid passageway 33 extending axially therethrough to the distal end 25. This passageway 33 has approximately the same internal diameter as the internal diameter of a tube 35 with which the fitting 11 is to be used.

The main body piece 21 has four cylindrical internal glands 37, 39, 41 and 43. These glands extend progressively radially outwardly from the fluid passageway 33 to the proximate end 27 of the main body piece 21. The gland 37 is sized according to the size of tube 35 with which the fitting 11 is to be used. The gland 37 must be large enough in diameter to receive the tube therein while small enough in diameter to provide tube stability in the fitting 11 when the tube 35 is fully inserted in the fitting 11. The base or shoulder 45 of gland 37 serves as a stop for the tube 35 when it is fully inserted in the fitting 11.

Gland 39 is an o-ring gland and receives the o-ring 15 closely therein. O-ring 15 provides a fluid tight seal between the interior of the body 13 and the exterior of tube 35. Therefore the relationship of the gland 39 diameter, the exterior diameter of the tube 35 and the size of the o-ring 15 must provide a desired amount of compression of the o-ring 15 to provide a good seal.

Gland 41 is a weld gland and gland 43 provides a non-weld space adjacent the proximate end 27 of the main body piece 21. Retainer 23 has a radially outer surface 47 which mates with and then is sonically welded to the weld gland 41 of the main body piece in the formation of the single body 13 by sonic welding.

The fitting 11 of the present invention is designed to prevent removal of the collet 17 from the body 13. This rugged design insures against accidental or other loss of the collet from the body prior to use of the fitting and also provides a more secure holding of the tube in the fitting. To provide the fitting 11 with this feature, the retainer 13 is axially split so as to form a slot 49. This allows the retainer 13 to be radially expanded as shown by the arrows in FIG. 3 for the collet 17 to be inserted in the retainer 23. The collet 17 is shown inserted in the retainer 23 in FIG. 9 prior to sonic welding of the retainer 23 to the main body piece 21.

The retainer slot 49 can have a tangential width of up to ⅛ the diameter of the retainer. Preferably the retainer 23 and the sides of the slot 49 are shaped to insure that when the retainer is pressed into the main body piece the sides close together and contact at the radially inner edges 51 and 53 and at the radially outer edges 55 and 57. Of course, the surface 47 also contacts the gland surface 41. Upon sonic welding this contact provides a good seal of the slot 49 and also provides a good seal between the retainer 23 and the main body piece 21. Small recesses 59 and 61 are formed in the proximate surface 63 of the retainer 23. These recesses have a depth of between about 0.001 inches and about 0.1 inches and prevent contact between the horn of the sonic welder from causing a gouge and flash on the surface 63.

To assemble the fitting of the present invention, the collet 17 is inserted in the retainer 23 as shown in FIG. 9. The o-ring 15 is inserted in the main body piece 21 as shown in FIG. 8. The retainer 23 is then inserted in the main body piece 21 and a sonic welding horn is placed adjacent the retainer 23. A solid weld between the circumferential surface 47 and the gland 41 as well as the sides of the slot 49 are thus formed by a single sonic welding step.

Figure 5:
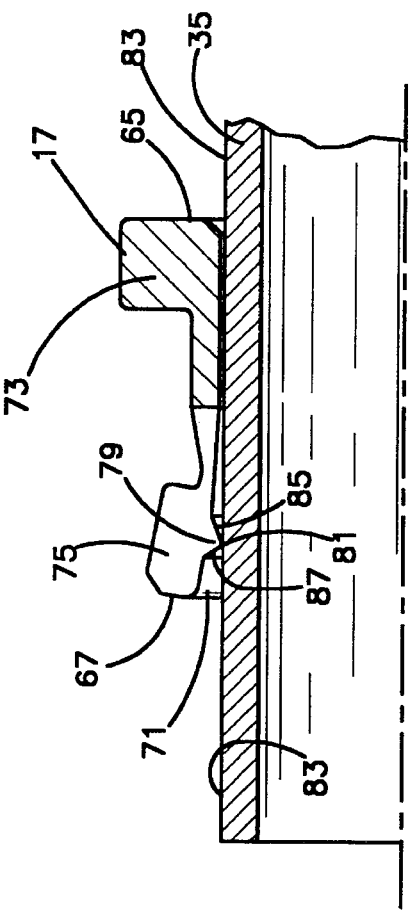
FIG. 5 is an enlarged cross-sectional view of the portion of the device shown in FIG. 4 taken along,the same lines as FIG. 4 with a tube inserted therein.
Figure 4:
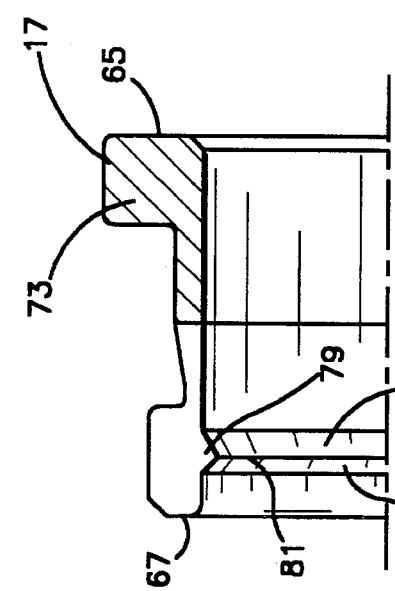
FIG. 4 is an enlarged cross-sectional view of a portion of the device shown in FIG. 1 taken along the same lines as FIG. 1.

Referring now to FIGS. 4 and 5 as well as FIG. 1, the collet 17 of the present invention is preferably formed of a single piece of molded plastic. It has a generally cylindrical shape with a proximate end 65 and a distal end 67. Four slots 69 extend axially into the distal end 67 of the collet 17 and are equally spaced from each other so that four equal circumferential sections or tangs 71 extend toward the distal end of the collet. This allows the distal end of the collet 17 to expand when a tube is inserted through the collet 17.

The collet 17 has radially outwardly extending cap 73 adjacent the proximate end 65. The collet 17 also has radially outwardly extending cam shoulders 75 on each of the circumferential sections 71 adjacent the distal end 67 of the collet. A cam surface 77 of the body 13 bears upon the cam shoulders 75 of the collet to move the circumferential sections radially inwardly when the collet is moved axially out of (to the right as shown in FIG. 10) the body 13. The cam surface 77 has a generally conical shape which narrows toward the proximate surface 63 of the retainer. The slots 69 are sufficiently narrow in tangential width so that the circumferential sections 71 can not move radially inwardly enough to allow the collet 17 to be removed from the body 13.

Each of the circumferential sections 71 has a radially inwardly facing circumferential tube gripper 79. Each gripper 79 has a gripper edge 81 which can bite into the exterior surface, 83 of a tube 35 to hold the tube 35 against axial movement with respect to the collet 17. The edge 81 is formed at the junction of a proximate circumferential ramp 85 and a distal circumferential surface 87.

The proximate circumferential ramp surface 85 faces a tube 35 being pushed into the body 13 through the collet 17 such that the tube 35 encounters the ramp 85 of each of the circumferential sections 71 to move each of the circumferential sections 71 radially outwardly. FIG. 4 shows the collet 17 in a relaxed condition without a tube inserted therethrough. FIG. 5 shows the collet 17 in an expanded condition with a tube inserted therethrough.

The gripper of the present invention is designed to prevent the tube from being scratched as it is inserted through the gripper 79 of the collet 17 while also allowing the gripper 79 to bite into and retain the tube once the tube has been inserted. To achieve this the angle of the ramp 85 relative to the surface 83 of the tube 35 inserted through the collet 17 must be in the range between 15 and 40 degrees. More preferably this angle ($\alpha$) is from about 20 to about 35 degrees and most preferably this angle is approximately 25 degrees. This angle is measured at the edge 81 since it is at the edge 81 where scratches will occur. Also, this angle is measured with the tube inserted. Since the circumferential sections 71 move outwardly approximately 5 degrees, this angle is approximately 5 degrees less than the angle would be if measured with the collet in a relaxed condition (if a hypothetical tube were inserted which did not move the circumferential sections radially apart).

Another angle important to preventing scratches on the tube when the tube is inserted in the fitting is the internal angle between the proximate circumferential ramp 85 and the distal circumferential surface 87. This angle ($\beta$), also measured at the edge 81, determines how "sharp" the gripper 79 is (a lower internal angle making the gripper sharper). Preferably this internal angle between the ramp 85 and the surface 87 is in the range between 75 and 120 degrees. More preferably, this internal angle is in the range between 100 and 120 degrees and most preferably this internal angle is approximately 110 degrees.

With the proximate ramp 85 and distal surface 87 configuration described, the present invention achieves a biting grip on a tube while not scratching the tube as it is inserted in the collet. This allows a secure hold on the tube by the collet gripper 79 while not producing leak path scratches which can not be sealed by the o-ring 15.

The edge 81 of the gripper 79 has an arc which does not form a circle when the collet is in a relaxed condition. As shown in the Prior Art FIG. 6, a circular arc in the relaxed condition produces a gap 91 near the center of the arc when the circumferential sections are moved radially outwardly by the insertion of the tube 35. This causes the edges 93 and 95 to scratch the surface of the tube when a tube is inserted through the collet 17. In the present invention, the edge 81 has an arc shape 97 which approximately equals the circumferential arc 99 of the exterior 83 of a tube which extends through said collet to spread said circumferential sections 71 thereof and to be held by the gripper edge 71 of each of said sections 71 such that said gripper edge 81 is less likely to scratch a tube pushed through the collet 17. The grip on the tube is also optimized due to the maximized tube/gripper contact in the expanded condition.

The fitting of the present invention is constructed entirely without metal. This is especially important in applications where contamination of the fluid conducted by the fitting is a consideration. In addition, the use of metal in, the gripper, as is common in the prior art, causes scratches on the tube inserted in the fitting which can cause leaks and is difficult to manufacture.

The materials of construction preferable for the body 13 include hard moldable plastics such as nylon, polyester, polypropylene, polyethylene, ABS, PVC, and acetyl homopolymers and copolymers, fluoropolymers, polysulfones, and polyetherimides. Acetyl copolymers are most preferred. Materials suitable for the o-ring 15 include elastomers and rubbers such as nitrile rubber, fluorocarbon rubber, silicone rubber, EPDM, and neoprene rubber.

Materials suitable for use in the collet include hard plastics with a hardness greater than the plastic material which forms the tube which is to be used in the fitting 11. Plastics which form tubes suitable for use with the present invention include polypropylene, polyethylene, polyurethane, nylon, vinyl and similar plastics of similar hardness. Generally these plastic tubes range in hardness from 60 durometer on the A scale to 100 durometer on the M scale. The collet must be harder than this; preferably 5 durometer points or more harder than the durometer of the tube (on the same scale as the tube). For example, a vinyl or urethane tube typically has a durometer in the range of 60 to 95 on the A scale. The collet 17 for use with this tube preferably has a durometer of at least 100 on the A scale (approximately 50 on the D scale). Polyester has a durometer in this range and would thus be a suitable material for collet 17 if only vinyl or urethane tubes were to be used with the fitting.

For another example, nylon tubing can have a 95 durometer on the M scale. A collet for use with this nylon tubing preferably has a 100 durometer on the M scale. Poly (ether ether ketone), poly ether ketones, and polyetherimides can have a sufficient hardness for a collet 17 for use with such nylon tubing.

Of course, it is desired to have a collet 17 which can be used with a wide variety of tube materials and still provide a reliable and durable grip. To be useful with most tube materials the collet must have a hardness durometer in the range of 70 to 120 on the M scale. To be used with almost all tube materials the collet must have a hardness durometer in the range of 95 to 120 on the M scale. Thus, plastics suitable for forming a collet 17 to be used with most plastic tubes include moldable plastics with a hardness in the range of 70 to 120 on the M scale. Moldable polymer plastics with hardnesses in the desired range include poly (ether ether ketones), poly ether ketones, polyetherimides, polybutylene terephthalates, polyphthalamides, polymers of acetal homopolymer, rigid nylons, fluoropolymers, polysulfones and polyesters. Preferably the collet 17 is formed from a selected one of this group of moldable polymer plastics.

To allow the collet to be more universally used with almost all plastic tubes the collet is more preferably formed of a moldable plastic having a hardness durometer in the range of 95 to 120 on the M scale. Plastics suitable for this use include poly (ether ether ketones), poly ether ketones, polyetherimides, polybutylene terephthalates, polyphthalamides and polymers of acetyl homopolymer. Most preferably, the collet 17 is formed of a polyetherimide such as the plastic sold under the trademark Ultem. This plastic has a hardness in the range of 96 to 100 on the M scale and does not fatigue quickly. Resistance to fatigue is important since the edge 81 is subjected to alternating and repeated bending stresses.

The all plastic gripper allows the fitting to be made entirely of plastic. This plus the configuration of the gripper (axial angles and arc) form an all plastic fitting which provides a better grip than prior art fittings having metal grippers. This is achieved with a relatively simple construction. Therefore, the present invention provides the advantage of an all plastic fitting, with a grip better than fittings comprised of metal parts and a simple, reliable, durable construction.

To use the push in plastic tube fitting 11 of the present invention the tube fitting is first threaded to a desired fluid connection element. With the clip 19 removed to allow the collet 17 to move axially inwardly, a tube 35 is inserted into the tube body 13 through the collet 17 and the o-ring 15. The tube is pushed into the body 13 until it seats at base 45 of gland 37. As the tube end passes through the collet 17, it first encounters the ramp 85 of gripper 79. This moved the collet 17 axially inwardly with the tube and then spreads the arms of the collet and the circumferential sections 75 radially outwardly. As the tube exterior passes under the edge 81 of the gripper 79 the angle of the ramp 85 to the exterior surface 83 of the tube 35 is between 15 and 40 degrees. It has been discovered that if this angle is greater than 40 degrees the exterior surface 83 of the tube 35 can be scratched. It has also been discovered that if the angle between the ramp 85 and the exterior surface 83 of tube 35 is less than 15 degrees the gripper 79 will not bite into the tube 35 sufficiently to provide a firm grip when the tube is attempted to be withdrawn from the fitting. It has also been discovered that the internal angle between the ramp 85 and the circumferential surface 87 must be between 75 degrees and 120 degrees in order to provide a sufficient grip. Angles less than 75 degrees produce a scratch whereas angles greater than 120 degrees will not provide a sufficient hold on the tube. More preferable and most preferable ranges for these angles are discussed above. The narrower ranges are necessary for certain tube materials.

Once the tube 35 passes through the gripper 79 the arms of the collet urge the circumferential sections 71 radially inwardly so that the gripper 79 grips the tube 35. This grip is increased by the cam action between the cam shoulder 75 and the cam surface 77 of the body 13 when the axial movement of the tube 35 moves the collet 17 axially outwardly.

If it is desired to remove the tube from the fitting, the collet 17 can be held in its axially innermost position against the body 13 so that the cam action between the cam shoulder 75 and the cam surface 77 will not occur. Under these circumstances the urging of the circumferential sections 75 radially inwardly by the bending of the collet arms does not produce such a strong grip on the tube 35. This allows the tube 35 to be removed.

To protect against accidental holding of the collet 17 in the axially innermost position, the clip 19 can be inserted between the cap 73 of the collet 17 and the proximate surface 63 of the body 13. The clip 19 has a horseshoe shape so that the ends are spread apart as the clip is inserted around the collet 17 to enclose the collet 17 and then be held on the collet 17.

Thus, the present invention is well adapted to achieve the objects and advantages mentioned as well as those inherent therein. The tube fittings described are especially adapted for use with plastic tubes from ¼ inch outer diameter to ½ inch outer diameter. However, the concepts of the invention could be adapted for other size tubes.

The above discussion of this invention is directed primarily to preferred embodiments and practices thereof. It will be readily apparent to those skilled in the art that further changes and modifications in the actual implementation of the concepts described herein can be made without departing from the spirit and scope of the invention as defined by the following claims.

What is claimed is:

1. An improved plastic push in tube fitting of the type having a plastic body, a seal for sealing between the body and a tube, and a plastic collet, the collet and seal being disposed in the body such that a tube can be pushed into the body through the collet and seal and then held against withdrawal from the body by the collet, the improvement comprising:

the collet being formed entirely of plastic and having a plurality of circumferential sections for encircling a tube pushed into the body, each of said sections having a radially inwardly facing circumferential tube gripper formed of:

proximate circumferential ramp which faces a tube being pushed into the body such that a tube being pushed into the body through the collet will encounter said ramp of each of said sections and move said circumferential sections radially apart, a distal circumferential surface which faces away from a tube being pushed into the body, and a gripper edge formed at the junction of the proximate circumferential ramp and the distal circumferential surface for engaging and holding a tube pushed into the body through said collet; and the gripper edge of each of said circumferential sections of said collet extends in a circumferential arc approximately equal to the circumferential arc of the exterior of a tube which extends through said collet to spread said circumferential sections thereof and to be held by the gripper edge of each of said sections such that said gripper edge is less likely to scratch a tube pushed through the collet and maximizes contact between said gripper edge and a tube pushed through the collet.

2. The push in tube fitting of claim 1 wherein the collet comprises a single molded piece with arms having ends of which form said circumferential sections; said arms urging the circumferential sections radially inwardly when a tube moves the sections radially outwardly; and wherein the body has a ramped opening in which said circumferential sections reside which ramped opening bears against and urges said circumferential sections radially inwardly as a tube held within said sections is moved toward withdrawal from the body.

3. The push in tube fitting of claim 1 wherein said collet is formed of a selected one of the group consisting of poly (ether ether ketone), poly ether ketones, fluoropolymers, polysulfones, polyesters, rigid nylon, polyetherimides, polybutylene terephthalates, polyphthalamides, and polymers of acetal homopolymer.

4. The push in tube fitting of claim 3 wherein said collet is formed of a selected one of the group consisting of poly (ether ether ketones), poly ether ketones, polyetherimides, polybutylene terephthalates, polyphthalamides and polymers of acetyl homopolymer.

5. The push in tube fitting of claim 4 wherein said collet is formed of polyetherimide.

6. The push in tube fitting of claim 1 wherein said proximate circumferential ramp and said distal circumferential surface have a configuration such that at said gripper edge said ramp extends radially away from a tube inserted through said collet at an angle between 15 and 40 degrees, and at said edge an internal angle between said circumferential ramp and said circumferential surface is from 75 to 120 degrees in order that said gripper and said gripper edge are less likely to scratch a tube pushed through the collet while the ability of said gripper edge to hold a tube against withdrawal from the body is improved.

7. The push in tube fitting of claim 6 wherein at said gripper edge said ramp extends radially away from a tube inserted through said collet at an angle between 20 and 35 degrees.

8. The push in tube fitting of claim 7 wherein at said gripper edge said ramp extends radially away from a tube inserted through said collet at an angle of approximately 25 degrees.

9. The push in tube fitting of claim 8 wherein at said gripper edge the internal angle between said circumferential ramp and said circumferential surface is from 100 to 120 degrees.

10. The push in tube fitting of claim 9 wherein at said gripper edge the internal angle between said circumferential ramp and said circumferential surface is approximately 110 degrees.

11. An improved plastic push in tube fitting of the type having a plastic body, a seal for sealing between the body and a tube, and a plastic collet, the collet and seal being disposed in the body such that a tube can be pushed into the body through the collet and seal and then held against withdrawl from the body by the collet, the improvement comprising:

the collet being formed entirely of plastic and having a plurality of circumferential sections for encircling a tube pushed into the body, each of said sections having a radially inwardly facing circumferential tube gripper formed of:

a proximate circumferential ramp which faces a tube being pushed into the body such that a tube being pushed into the body through the collet will encounter said ramp of each of said sections and move said circumferential sections radially apart, a distal circumferential surface which faces away from a tube being pushed into the body, and a gripper edge formed at the junction of the proximate circumferential ramp and the distal circumferential surface for engaging and holding a tube pushed into the body through said collet;

said proximate circumferential ramp and said distal circumferential surface have a configuration such that at said gripper edge said ramp extends radially away from a tube inserted through said collet at an angle between 15 and 40 degrees, and at said edge an internal angle between said circumferential ramp and said circumferential surface is from 75 to 120 degrees in order that said gripper and said gripper edge are less likely to scratch a tube pushed through the collet while the ability of said gripper edge to hold a tube against withdrawal from the body is improved; and wherein the gripper edge of each of said circumferential sections of said collet extends in a circumferential arc approximately equal to the circumferential arc of the exterior of a tube which extends through said collet to spread said circumferential sections thereof and to be held by the gripper edge of each of said sections such that said gripper edge is less likely to scratch a tube pushed through the collet and maximizes contact between the gripper edge and a tube pushed through the collet.

12. The push in tube fitting of claim 11 wherein the collet comprises a single molded piece with arms having ends of which form said circumferential sections; said arms urging the circumferential sections radially inwardly when a tube moves the sections radially outwardly; and wherein the body has a ramped opening in which said circumferential sections reside which ramped opening bears against and urges said circumferential sections radially inwardly as a tube held within said sections is moved toward withdrawal from the body.

13. The push in tube fitting of claim 11 wherein said collet is formed of a selected one of the group consisting of poly (ether ether ketone), poly ether ketones, fluoropolymers, polysulfones, polyesters, rigid nylon, polyetherimides, polybutylene terephthalates, polyphthalamides, and polymers of acetal homopolymer.

14. The push in tube fitting of claim 11 wherein said collet is formed of a selected one of the group consisting of poly (ether ether ketones), poly ether ketones, polyetherimides, polybutylene terephthalates, polyphthalamides and polymers of acetyl homopolymer.

15. The push in tube fitting of claim 11 wherein said collet is formed of polyetherimide.

16. The push in tube fitting of claim 11 wherein at said gripper edge said ramp extends radially away from a tube inserted through said collet at an angle between 20 and 35 degrees.

17. The push in tube fitting of claim 11 wherein at said gripper edge said ramp extends radially away from a tube inserted through said collet at an angle of approximately 25 degrees.

18. The push in tube fitting of claim 11 wherein at said gripper edge the internal angle between said circumferential ramp and said circumferential surface is from 100 to 120 degrees.

19. The push in tube fitting of claim 11 wherein at said gripper edge the internal angle between said circumferential ramp and said circumferential surface is approximately 110 degrees.

* * * * *

UNITED STATES PATENT AND TRADEMARK OFFICE
CERTIFICATE OF CORRECTION

PATENT NO. : 5,584,513

DATED : Dec. 17, 1996

INVENTOR(S) : Michael A. Sweeney, et al

It is certified that error appears in the above-identified patent and that said Letters Patent is hereby corrected as shown below:

On the title page, under item [19] and item [54] "Sweeny" should read --Sweeney--.

Signed and Sealed this

Twenty-fifth Day of March, 1997

Attest:

BRUCE LEHMAN

Attesting Officer

Commissioner of Patents and Trademarks